US012372437B1

(12) United States Patent
Jin et al.

(10) Patent No.: US 12,372,437 B1
(45) Date of Patent: Jul. 29, 2025

(54) DEVICE AND METHOD FOR TESTING STARTING CHARACTERISTICS OF REFRIGERATION COMPRESSOR WITH ADJUSTABLE SYSTEM VOLUME

(71) Applicant: ZHEJIANG UNIVERSITY OF TECHNOLOGY, Zhejiang (CN)

(72) Inventors: Huaqiang Jin, Zhejiang (CN); Xi Shen, Zhejiang (CN); Yuejin Huang, Zhejiang (CN); Jiangping Gu, Zhejiang (CN); Yingjie Xu, Zhejiang (CN); Zhe Sun, Zhejiang (CN)

(73) Assignee: ZHEJIANG UNIVERSITY OF TECHNLOGY, Zhejiang (CN)

( * ) Notice: Subject to any disclaimer, the term of this patent is extended or adjusted under 35 U.S.C. 154(b) by 0 days.

(21) Appl. No.: 19/023,343

(22) Filed: Jan. 16, 2025

Related U.S. Application Data

(63) Continuation of application No. PCT/CN2024/127254, filed on Oct. 25, 2024.

(30) Foreign Application Priority Data

Jul. 8, 2024 (CN) .......................... 202410902784.0

(51) Int. Cl.
*G01M 99/00* (2011.01)
(52) U.S. Cl.
CPC ................... *G01M 99/008* (2013.01)

(58) Field of Classification Search
CPC .. G01M 99/008; G01M 99/002; G01M 99/00; G01M 13/00; G01N 17/002; G01N 2203/0222; G01N 2203/0224; G01N 2203/0226; G01N 2203/0228; G01N 25/00
USPC .............................................. 73/865.9, 865.6
See application file for complete search history.

(56) References Cited

FOREIGN PATENT DOCUMENTS

| CN | 201443501 U | * | 4/2010 | .............. F04B 51/00 |
|---|---|---|---|---|
| CN | 111140488 B | * | 7/2021 | .............. F04B 51/00 |
| CN | 115949581 A | * | 4/2023 | .............. F04B 51/00 |
| KR | 20220105359 A | * | 7/2022 | .......... G01M 99/005 |

\* cited by examiner

*Primary Examiner* — Laura Martin
*Assistant Examiner* — Anthony W Megna Fuentes
(74) *Attorney, Agent, or Firm* — JCIPRNET

(57) ABSTRACT

The present disclosure relates to the technical field of compressor performance tests and detection apparatus manufacturing, and discloses a device and method for testing starting characteristics of a refrigeration compressor with adjustable system volume. The device includes tested samples, a test refrigeration system and a test control system. The testing device realizes accurate adjustment of volume of the refrigeration system by means of control of a high-voltage terminal volume adjuster, a low-voltage terminal volume adjuster and condensing coils, and matches test requirements of different compressors for the volume of the refrigeration system, such that a substitute refrigeration system with adjustable volume is provided for testing the starting characteristics.

9 Claims, 7 Drawing Sheets

DEVICE AND METHOD FOR TESTING STARTING CHARACTERISTICS OF REFRIGERATION COMPRESSOR WITH ADJUSTABLE SYSTEM VOLUME

CROSS-REFERENCE TO RELATED APPLICATION

This application is a continuation of international application of PCT application serial no. PCT/CN2024/127254, filed on Oct. 25, 2024, which claims the priority benefit of China application serial no. 202410902784.0, filed on Jul. 8, 2024. The entirety of each of the above-mentioned patent applications is hereby incorporated by reference herein and made a part of this specification.

BACKGROUND

Technical Field

The present disclosure relates to the technical field of performance tests of compressors of refrigeration appliances and detection apparatus manufacturing, in particular to a device and method for testing starting characteristics of a compressor of a refrigeration appliance with adjustable system volume.

Description of Related Art

The variable frequency compressor uses a brushless direct current electric motor, and the start of the compressor is controlled by a variable frequency driver. At present, the automation level of the testing the starting characteristics of variable frequency compressor in the refrigeration compressor industry is still relatively low, so it is difficult to accurately measure the parameters such as interphase voltage, phase current, vibration acceleration, suction and exhaust pressure at the starting moment of variable frequency compressor, and then it is impossible to accurately assess the starting characteristics of variable frequency compressor.

In summary, the development of an testing device for the starting characteristics of variable frequency compressor of refrigeration appliances, especially the system volume adjustable technology for refrigeration appliances matching different cooling capacity ranges, has become a key problem that needs to be solved urgently in the refrigeration compressor manufacturing industry.

SUMMARY

In view of the above problems existing in the prior art, an objective of the present disclosure is to provide a device and method for testing starting characteristics of a compressor with adjustable system volume, which realizes accurate measurement and assessing of starting characteristic parameters of a variable frequency refrigeration compressor in a specific environment.

The present disclosure provides the following technical solution:

The device for testing starting characteristics of a refrigeration compressor with adjustable system volume includes tested samples (a variable frequency compressor and a variable frequency driver), a test refrigeration system and a test control system. The testing device uses a dual-environment structure, two assembly stations are set for the tested samples, and are configured to provide different test temperature environments, that is, a normal-temperature test environment and a high-temperature test environment, and the tested samples at the two assembly stations may be subjected to a round-trip test at normal temperature and high temperature. Test temperature of the normal-temperature test environment is temperature of the environment where the tested samples are located, and a test temperature range of the high-temperature test environment is within environment temperature to 90° C. (including 90° C.).

Further, the tested samples include a tested variable frequency compressor and a tested variable frequency driver, the tested samples are put in a normal-temperature environment box when a normal-temperature working condition test is performed on the tested variable frequency compressor and the tested variable frequency driver, and the tested samples are put in a high-temperature environment box when a high-temperature working condition test is performed on the tested variable frequency compressor and the tested variable frequency driver.

Further, the test refrigeration system includes a main circulation subsystem, a low-voltage terminal volume adjusting subsystem, a high-voltage terminal volume adjusting subsystem, a liquid adding subsystem, an exhaust subsystem, a recovery subsystem and a vacuumizing subsystem. The main circulation subsystem is composed of normal-temperature valves, high-temperature valves, a high-temperature environment box heating pipe, an exhaust pressure sensor, large condensing coil valves, large condensing coils, small condensing coil valves, small condensing coils, a condensing chamber heating pipe, a balance valve, a stop valve, an expansion valve, an evaporation coil, an evaporation fan and a suction pressure sensor. The low-voltage terminal volume adjusting subsystem is composed of a low-voltage terminal volume valve and a low-voltage terminal volume adjuster. The high-voltage terminal volume adjusting subsystem is composed of a high-voltage terminal volume valve and a high-voltage terminal volume adjuster. The liquid adding subsystem is composed of a one-way valve, a suction liquid adding valve, an exhaust liquid adding valve, a liquid adding needle valve and a liquid adding hand valve. The exhaust subsystem is composed of a one-way valve, a suction discharging valve, an exhaust discharging valve, a discharging needle valve and a discharging hand valve. The recovery subsystem is composed of a recycling hand valve, a recovery hand valve, a recovery liquid storage tank, a recovery condenser, an oil separator, a recovery pump and a recovery valve. The vacuumizing subsystem is composed of an evacuation valve and a vacuum pump.

Further, the test control system takes an industrial control computer as a control core, which realizes system control, data acquisition and data processing of the whole testing device. The industrial control computer uses a display, a keyboard and mouse and a printer as input and output apparatuses, such that man-machine conversation and report printing of the testing device are realized. The industrial control computer realizes input and output control of digital quantity of the testing device by means of a digital I/O control module. The input of the digital quantity includes an air source undervoltage alarm signal, an environment overtemperature alarm signal and condensing chamber overtemperature alarm signal. The output of the digital quantity (the output of the digital quantity refers to 0/1 opening and closing signal) includes a high-temperature environment box heater (opening and closing signal), a condensing chamber heater (opening and closing signal), a high-temperature environment box cooling unit (opening and closing signal), a frequency gear of a variable frequency power supply (high and low gear signal), a voltage gear of the variable frequency power supply (high and low gear signal), the normal-temperature valves (opening and closing signals), the high-temperature valves (opening and closing signals), the balance valve (opening and closing signal), the stop valve (opening and closing signal), the recovery pump (opening and closing signal), the recovery valve (opening and closing signal), the vacuum pump (opening and closing signal), a vacuum valve (opening and closing signal), the suction liquid adding valve (opening and closing signal), the suction discharging valve (opening and closing signal), the exhaust liquid adding valve (opening and closing signal), the exhaust discharging valve (opening and closing signal), the low-voltage terminal volume valve (opening and closing signal), the high-voltage terminal volume valve (opening and closing signal), a low-voltage terminal volume adjustment driver (PWM pulse signal), a high-voltage terminal volume adjustment driver (PWM pulse signal), the large condensing coil valves (opening and closing signals), the small condensing coil valves (opening and closing signals) and the tested variable frequency compressor (start and stop signal). The industrial control computer realizes high-speed synchronous collection of main starting characteristic parameters (transient characteristic parameters) of the tested variable frequency compressor by means of the high-speed AI sampling module, including sensor data such as suction pressure, exhaust pressure, UV voltage, VW voltage, WU voltage, bus current, U-phase current, V-phase current, W-phase current, vertical vibration acceleration, horizontal vibration acceleration. The industrial control computer collects temperature data (high-temperature environment box temperature, condensing chamber temperature and non-transient characteristic parameters) of key parts of the tested variable frequency compressor and the tested variable frequency driver by means of a temperature sampling module, including sensor data such as the high-temperature environment box temperature, the condensing chamber temperature, housing temperature of the compressor, in-housing temperature of the variable frequency driver, power module temperature, rectifier bridge temperature, filter capacitor temperature and radiator temperature. The industrial control computer realizes automatic adjustment of the expansion valve and voltage of a variable frequency power supply of the refrigeration system by means of an AO output module. The industrial control computer realizes collection of input voltage, current, power, frequency and other electrical parameters of the variable frequency compressor and the variable frequency driver by means of an electrical parameter meter. The industrial control computer realizes automatic adjustment of rotation speed of the variable frequency compressor by means of a signal generator.

Further, in the device for testing starting characteristics of a refrigeration compressor with adjustable system volume, starting characteristic parameters of the tested samples include suction and exhaust pressure, working voltage, operating current, vibration acceleration, temperature of the key parts, etc. The starting characteristic parameters of the variable frequency compressor may be divided into transient characteristic parameters and non-transient characteristic parameters. The transient characteristic parameters include exhaust pressure, suction pressure, vertical vibration acceleration and horizontal vibration acceleration of the variable frequency compressor, and UV voltage, VW voltage, WU voltage, bus current, U-phase current, V-phase current and W-phase current input by the variable frequency compressor. High-speed synchronous collection mode is used, a sampling rate ranges thereof are 1 KS/s-50 KS/s, which is selected according to required accuracy of measuring the characteristic parameters. A default sampling rate of the testing device is 10 KS/s. The non-transient characteristic parameters include housing temperature of the compressor, in-housing temperature of the variable frequency driver, power module temperature, rectifier bridge temperature, filter capacitor temperature and radiator temperature, and data collection is completed by the temperature sampling module.

Further, in the device for testing starting characteristics of a refrigeration compressor with adjustable system volume, volume of the refrigeration system may be adjusted by means of the high-voltage terminal volume adjuster, the low-voltage terminal volume adjuster and the condensing coils. The high-voltage terminal volume adjustment is realized by a piston position of an internal cavity therein. The low-voltage terminal volume adjustment is realized by a piston position of an internal cavity therein. The liquid storage volume of the system is adjusted by the condensing coils, and opening and closing of the large condensing coil valves and the small condensing coil valves may realize 3 liquid storage volume combinations.

The testing method for testing starting characteristics of a refrigeration compressor with adjustable system volume includes:

step 1, mounting the tested variable frequency compressor and the tested variable frequency driver: determining test environment temperature requirements of the tested samples; if a test is performed in a normal-temperature environment, putting the tested variable frequency compressor and the tested variable frequency driver in the normal-temperature environment box; and if a test is performed in a high-temperature environment, putting the tested variable frequency compressor and the tested variable frequency driver in the high-temperature environment box, and then completing connection between suction and exhaust pipelines and an electrical circuit of the tested variable frequency compressor.

Step 2, setting test parameters and test modes: before testing the starting characteristics, setting test working conditions, and working condition parameters include the exhaust pressure, the suction pressure, the environment temperature, the working voltage, rotation speed frequency and the number of cycles. The test modes are divided into two test modes, one is single working condition point test, the other is multi-working condition point test. The single working condition point test refers to a starting characteristic test of the tested samples under a single set operating parameter, complete the characteristic assessing, and generate a report. The multi-working condition point test refers to a starting characteristic test of the tested samples under multi-point operating parameters, after one operating point is completed, the operating parameters are changed according to a set value, and the system automatically tests the new operating point until all the testing points are completed, and finally, the characteristic assessing is completed, and a report is generated.

Step 3, adjusting volume of the test refrigeration system: determining system volume for testing the starting characteristics of the tested variable frequency compressor according to a matching situation of the tested samples and the test refrigeration system, and then completing volume adjustment of the whole test refrigeration system of the testing device for the starting characteristics of the compressor by means of piston positions of a high-voltage terminal volume adjuster and a low-voltage terminal volume adjuster, and opening and closing of the large condensing coil valves and the small condensing coil valves.

Step 4, adjusting test working conditions of the test refrigeration system: automatically adjusting parameters such as the suction pressure, the exhaust pressure, the environment temperature, the working voltage, the rotation speed frequency of the starting characteristics of the compressor of the testing device, and starting the tested variable frequency compressor by the variable frequency driver when working condition parameters satisfy set requirements.

Step 5: collecting the starting characteristic parameters: After the tested variable frequency compressor is started, starting to synchronously collect various characteristic parameters by the high-speed AI sampling module of the test control system, including suction and discharge pressure, interphase voltage, phase line current, vibration acceleration, etc. Further, the temperature sampling module collects the housing temperature of the variable frequency compressor, the in-housing temperature of the driver, the power module temperature, etc., and also collecting other data by the test control system, including various electrical parameters input by the variable frequency driver. After the tested variable frequency compressor operates for a certain time, the test control system turns off the compressor, and then determines whether the number of cycles satisfy the set requirements.

Step 6, assessing the starting characteristics: processing the obtained test data, assessing the starting characteristics of the tested variable frequency compressor and the tested variable frequency driver, generating a starting characteristic assessing report, and finally saving the test data and the report in a database.

Further, according to the testing method for testing starting characteristics of a refrigeration compressor with adjustable system volume, assessing of starting transient characteristic parameters thereof is determination of the parameters such as the suction and discharge pressure, the vibration acceleration, the interphase voltage and the phase line current. In a starting process of the tested variable frequency compressor, if the minimum value $p_{smin}$ of the suction pressure $p_s$ is less than or equal to a design threshold $p'_s$, the suction pressure is determined to be qualified, otherwise the suction pressure is determined to be unqualified; if the maximum value $p_{dmax}$ of the exhaust pressure $p_d$ is greater than or equal to a design threshold $p'_d$, the exhaust pressure is determined to be qualified, otherwise the exhaust pressure is determined to be unqualified; if the maximum value $a_{imax}$ of the vibration acceleration $a_i$ is less than or equal to a design threshold $a'_i$, the vibration acceleration is determined to be qualified, otherwise the vibration acceleration is determined to be unqualified; if the maximum value $U_{jmax}$ of the interphase voltage $U_j$ is less than or equal to a design threshold $U'_j$, the interphase voltage is determined to be qualified, otherwise the interphase voltage is determined to be unqualified; if the maximum value $I_{kmax}$ of the phase line current $I_k$ is less than or equal to a design threshold $I'_k$, the phase line current is determined to be qualified, otherwise the phase line current is determined to be unqualified. Specific determination conditions are shown in Formula (1):

$$\begin{cases} p_{s\ min} \leq p'_s \\ p_{d\ max} \geq p'_d \\ a_{imax} \leq a'_i & i = 1, 2 \\ U_{jmax} \leq U'_j & j = 1, 2, 3 \\ I_{kmax} \leq I'_k & k = 1, 2, 3, 4 \end{cases} \tag{1}$$

in the formula, $a_1$ is the vertical vibration acceleration, and $a'_1$ is a design threshold of the vertical vibration acceleration. $a_2$ is the horizontal vibration acceleration, and $a'_2$ is a design threshold of the horizontal vibration acceleration. $U_1$ is the UV voltage, and $U'_1$ is a design threshold of the UV voltage. $U_2$ is the VW voltage, and $U'_2$ is a design threshold of the VW voltage. $U_3$ is the WU voltage, and $U'_3$ is a design threshold of the WU voltage. $I_1$ is the bus current, and $I'_1$ is a design threshold of the bus current. $I_2$ is the U-phase current, and $I'_2$ is a design threshold of the U-phase current. $I_3$ is the V-phase current, and $I'_3$ is a design threshold of the V-phase current. $I_4$ is the W-phase current, and $I'_4$ is a design threshold of the W-phase current.

Further, according to the testing method for the device for testing starting characteristics of a refrigeration compressor with adjustable system volume, assessing of starting non-transient characteristic parameters thereof is determination of the parameters such as the housing temperature, the in-housing temperature of the variable frequency driver, the power module temperature, the rectifier bridge temperature, the filter capacitor temperature and the radiator temperature. In the starting process of the tested variable frequency compressor, if the maximum value $T_{imax}$ of all the temperature is less than or equal to a design threshold $T'_i$, the temperature is determined to be qualified, otherwise the temperature is determined to be unqualified. Specific judgment conditions are shown in Formula (2):

$$T_{imax} \leq T'_i,\ i = 1,2,3,4,5,6 \tag{2}$$

in the formula, $T_1$ is the housing temperature, and $T'_1$ is a design threshold of the housing temperature. $T_2$ is the in-housing temperature of the variable frequency driver, and $T'_2$ is a design threshold of the in-housing temperature of the variable frequency driver. $T_3$ is the power module temperature, and $T'_3$ is a design threshold of the power module temperature. $T_4$ is the rectifier bridge temperature, and $T'_4$ is a design threshold of the rectifier bridge temperature. $T_5$ is the filter capacitor temperature, and $T'_5$ is a design threshold of the filter capacitor temperature. $T_6$ is the radiator temperature, and $T'_6$ is a design threshold of the radiator temperature.

Further, according to the testing method for testing starting characteristics of a refrigeration compressor with adjustable system volume, the starting characteristics of the tested samples are assessed by the real-time rotation speed in the starting stage. Firstly, the phase currents of the tested variable frequency compressor are subjected to time-frequency transformation, a time-frequency diagram of the currents in the starting stage is obtained, then the real-time rotation speed of the tested variable-frequency compressor may be obtained, and whether the starting characteristics thereof satisfy the design requirements is determined by a real-time rotation speed curve in the starting stage. Calculation of the real-time rotation speed of the measured variable frequency compressor is shown in Formula (3):

$$n = \begin{cases} 30f & \text{(Rotor having 2 pole pairs)} \\ 20f & \text{(Rotor having 3 pole pairs)} \end{cases}; \tag{3}$$

in the formula, n is rotation speed of the tested variable frequency compressor, and f is current frequency of the tested variable frequency compressor. By using the above technology, compared with the prior art, the present disclosure has the following beneficial effects as follows:

1) The testing device of the present disclosure uses a dual-environment structure, and the tested samples are tested in a normal-temperature working condition and a high-temperature working condition in different environmental boxes, and then the tested samples at the two assembly stations may be subjected to the round-trip test at the normal temperature and the high temperature, which considers not only economy of the testing device, but also improves the test efficiency.

2) According to the present disclosure, the high-voltage terminal volume adjuster, the low-voltage terminal volume adjuster and the condensing coils are used for adjustment, accurate adjustment of volume of the refrigeration system is realized, and test requirements of different compressors for the volume of the refrigeration system match, such that a substitute refrigeration system with adjustable volume is provided for testing the starting characteristics. The test requirements of the tested samples for different refrigeration system volumes are satisfied, and requirements for testing starting characteristics of variable frequency compressors with various displacements are satisfied, such that a test range of the device is significantly improved.

3) In the test of the device of the present disclosure, the test control system realizes intelligent control of the filling amount of a test medium, and liquid is automatically added and discharged according to a set suction and discharge pressure working condition without the operation of testers, such that intelligent degree of the device is greatly improved.

4) The comprehensive function of the testing device, the refrigeration system and the test control system may realize a full-automatic test of the starting characteristics of the variable frequency compressor in different environments, a single working condition or multiple working conditions, and complete determination of the starting characteristics and the generation of the test report, and the test data are stored in the database.

5) The present disclosure is not only suitable for a research on the matching between the compressor and a refrigeration appliance system, but also suitable for quality inspection in manufacturing and production of the compressor.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

Figure 1:
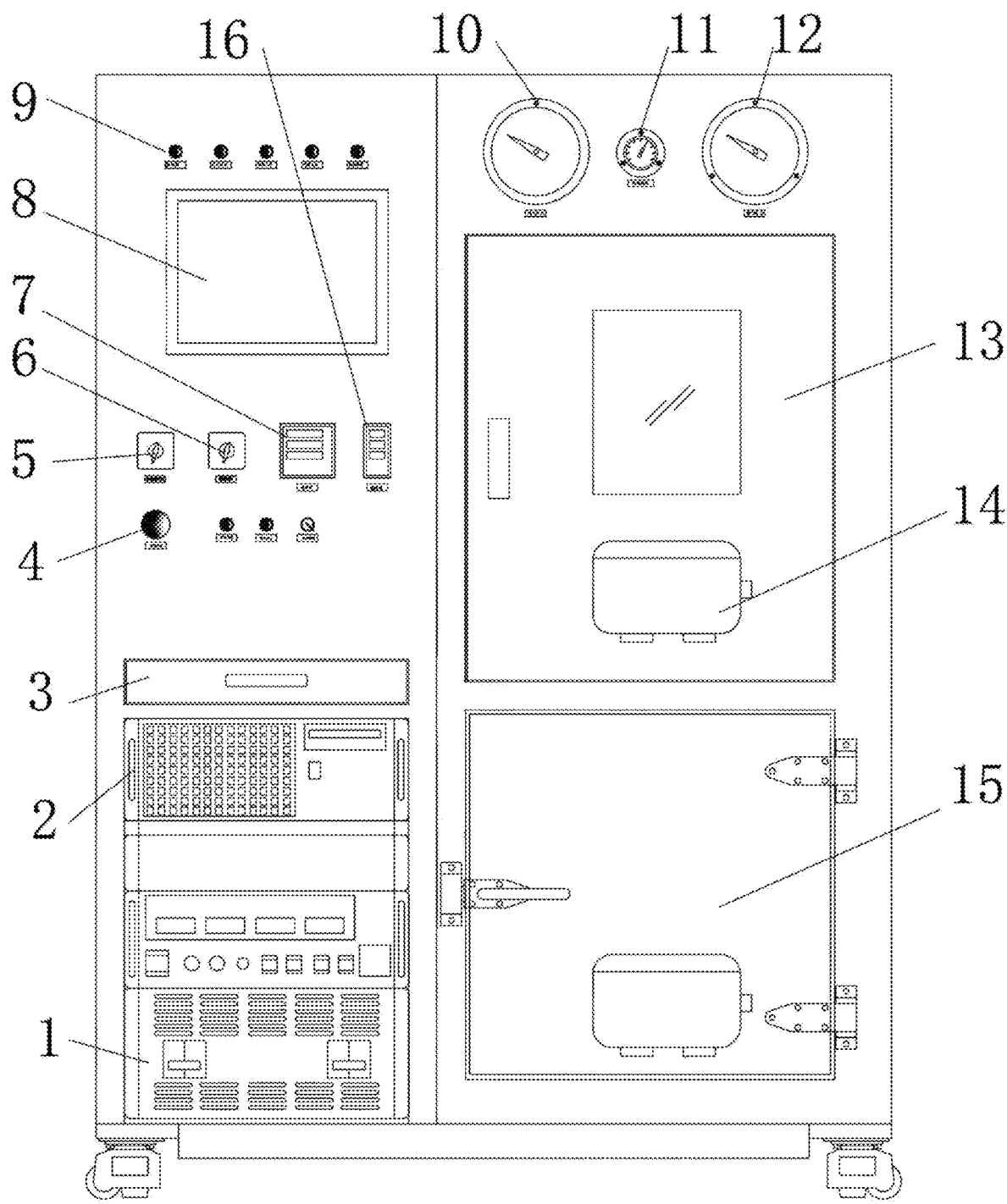
FIG. 1 is a schematic structural diagram of an appearance of a device in the present disclosure.

In the figures: 1. variable frequency power supply; 2. industrial control computer; 3. keyboard and mouse; 4. emergency stop switch; 5. main power switch; 6. power selection switch; 7. electrical parameter meter; 8. display; 9. status indicator lamp; 10. exhaust gas pressure gauge; 11. unit high pressure gauge; 12. suction pressure gauge; 13. normal-temperature environment box; 14. tested variable frequency compressor; 15. high-temperature environment box; 16. signal generator; 17. electrical box door; 18. electrical box; 19. test refrigeration system; 20. condensing chamber; 21. normal-temperature environment box door;

22. normal-temperature valve, 22-1. normal-temperature outlet valve, 22-2. normal-temperature inlet valve;

23. high-temperature valve, 23-1. high-temperature outlet valve, 23-2. high-temperature inlet valve;

24. exhaust pressure sensor;

25. large condensing coil valve, 25-1. large condensing coil inlet valve, 25-2. large condensing coil outlet valve;

26. small condensing coil valve, 26-1. small condensing coil inlet valve, 26-2. small condensing coil outlet valve;

27. large condensing coil; 28. small condensing coil; 29. balance valve; 30. stop valve; 31. expansion valve; 32. evaporation coil; 33. evaporation fan; 34. suction pressure sensor; 35. evacuation valve; 36. vacuum pump; 37. suction discharging valve; 38. one-way valve; 39. suction liquid adding valve; 40. low-voltage terminal volume valve; 41. low-voltage terminal volume adjuster; 42. high-voltage terminal volume adjuster; 43. high-voltage terminal volume valve; 44. exhaust liquid adding valve; 45. liquid needle valve; 46. liquid adding hand valve; 47. exhaust discharging valve; 48. discharging needle valve; 49. recycling hand valve; 50. discharging hand valve; 51. recovery hand valve; 52. recovery liquid storage tank; 53. recovery condenser; 54. oil separator; 55. recovery pump; 56. recovery valve; 57. high-temperature environment box heater; 58. condensing chamber heater; 59. printer; 60. digital I/O control module; 61. High-speed AI sampling module; 62. Temperature sampling module; 63. AO output module; 64. air source undervoltage alarm signal; 65. environment overtemperature alarm signal; 66. condensing chamber overtemperature alarm signal; 67. high-temperature environment box cooling unit; 68. low-voltage terminal volume adjustment driver; 69. high-voltage terminal volume adjustment driver; 70. UV voltage sensor; 71. VW voltage sensor; 72. WU voltage sensor; 73. bus current sensor; 74. U-phase current sensor; 75. V-phase current sensor; 76. W-phase current sensor; 77. vertical vibration sensor; 78. horizontal vibration sensor; 79. high-temperature environment box temperature sensor; 80. condensing chamber temperature sensor; 81. compressor housing temperature sensor; 82. driver in-housing temperature sensor; 83. power module temperature sensor; 84. rectifier bridge temperature sensor; 85. filter capacitor temperature sensor; 86. radiator temperature sensor.

DESCRIPTION OF THE EMBODIMENTS

In order to make the objective, technical solution and advantages of the present disclosure clearer and more specific, the present disclosure will be further described in detail bellow with reference to accompanying drawings of the description and examples. It should be understood that the specific examples described herein are merely illustrative of the present disclosure and is not intended to limit the present disclosure.

On the contrary, the present disclosure covers any substitutions, modifications, equivalent methods and solutions within the spirit and scope of the present disclosure defined by the claims. Further, in order to make the public have a better understanding of the present disclosure, some specific details are described in detail in the following detailed description of the present disclosure. It is understandable to those skilled in the art that the present disclosure can be fully understood without the description of these details.

An appearance structure of a device for testing starting characteristics of refrigeration compressor with adjustable system volume in the present example is shown in FIG. 1, and includes a tested variable frequency compressor 14 and a variable frequency driver, a test refrigeration system 19 and a test control system. The testing device uses a dual-environment structure, and two assembly stations are set for test samples, and are configured to provide different test temperature environments. When a test is performed at normal temperature, the tested variable frequency compressor 14 and the tested variable frequency driver are mounted in a normal-temperature environment box 13. When a test is performed at high temperature, the tested variable frequency compressor 14 and the variable frequency driver are mounted in a high-temperature environment box 15. An exhaust pressure gauge 10, a unit high pressure gauge 11 and a suction pressure gauge 12 are arranged on the normal-temperature environment box 13. An upper part of a left side of the testing device is provided with an emergency stop switch 4, a main power switch 5, a power selection switch 6, an electrical parameter meter 7, a display 8, a status indicator lamp 9 and a signal generator 16. A lower part of the left side of the testing device is provided with a variable frequency power supply 1, an industrial control computer 2 and a keyboard and mouse 3.

Figure 2:
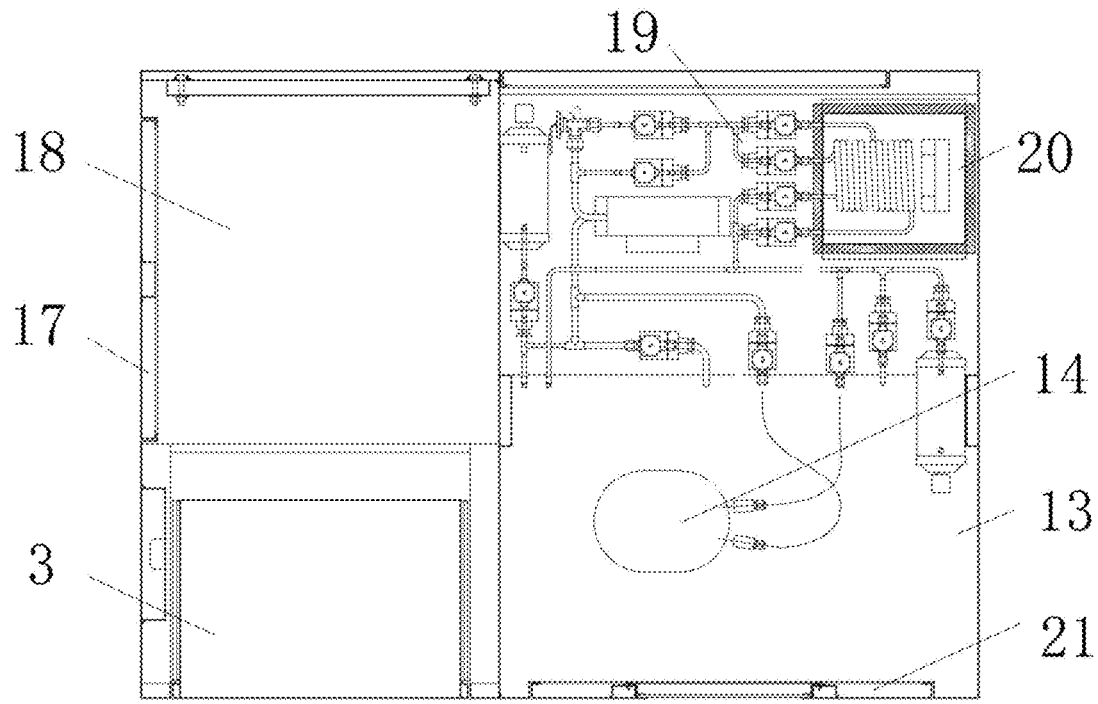
FIG. 2 is a section view of a side structure of the device in the present disclosure.

A side section of the device for testing starting characteristics of refrigeration compressor with adjustable system volume in the present example is shown in FIG. 2, the left side of the testing device is provided with an electrical box 18, and the electric box 18 is provided with an electrical box door 17. A right side of the testing device is provided with the normal-temperature environment box 13, in which mounting stations of the tested samples and the test refrigeration system 19. The test refrigeration system 19 includes pipelines, valves, a condensing chamber 20, etc. The normal-temperature environment box 13 is provided with a normal-temperature environment box door 21 and a glass observation window.

Figure 3:
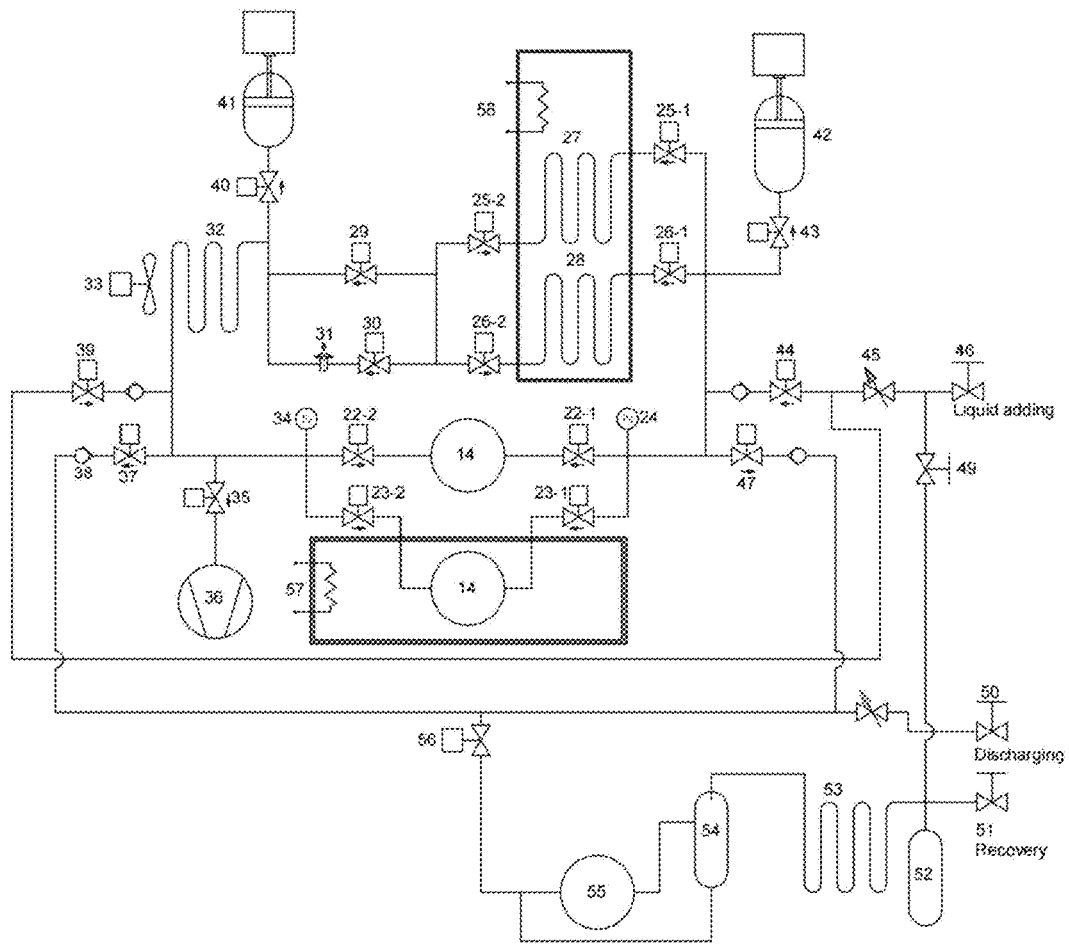
FIG. 3 is a diagram showing structural composition of a refrigeration system of the device in the present disclosure.

According to the device for testing starting characteristics of a refrigeration compressor with adjustable system volume in the present example, structural composition of the test refrigeration system 19 is shown in FIG. 3, and the test refrigeration system includes a main circulation subsystem, a low-voltage terminal volume adjusting subsystem, a high-voltage terminal volume adjusting subsystem, a liquid adding subsystem, an exhaust subsystem, a recovery subsystem and a vacuumizing subsystem. A test medium with which the test refrigeration system is filled may be nitrogen or a refrigerant (R600a, R290, R1234yf, R134a, R404a, etc.).

In the main circulation subsystem of the test refrigeration system in the present example, when a test is performed in a normal-temperature working condition, an exhaust interface and a suction interface of the tested variable frequency compressor 14 are mounted on a normal-temperature outlet valve 22-1 and a normal-temperature inlet valve 22-2 separately. When a test is performed in a high-temperature working condition, an exhaust interface and a suction interface of the tested variable frequency compressor 14 are mounted on a high-temperature outlet valve 23-1 and a high-temperature inlet valve 23-2 separately. The normal-temperature outlet valve 22-1 and the high-temperature outlet valve 23-1 are connected to an exhaust pressure sensor 24, a large condensing coil inlet valve 25-1 and a small condensing coil inlet valve 26-1, and then connected to a large condensing coil 27, a large condensing coil outlet valve 25-2, the small condensing coil 28 and the small condensing coil outlet valve 26-2 separately, and the large condensing coil outlet valve 25-2 and the small condensing coil outlet valve 26-2 are connected to a balance valve 29 and a stop valve 30 separately. Then the stop valve 30 is connected to an expansion valve 31, the balance valve 29 and the expansion valve 31 are connected to an evaporation coil 32, an evaporation fan 33 is located in front of the evaporation coil 32, and the evaporation coil 32 is connected to a suction pressure sensor 34, the normal-temperature inlet valve 22-2 and the high-temperature inlet valve 23-2.

Volume of the test refrigeration system in the present example may be adjusted by the low-voltage terminal volume adjusting subsystem, the high-voltage terminal volume adjusting subsystem and the condensing coils. In the low-voltage terminal volume adjusting subsystem, a low-voltage terminal volume adjuster 41 is connected to a low-voltage terminal volume valve 40, and the low-voltage terminal volume valve 40 is connected to the evaporation coil 32, the balance valve 29 and the expansion valve 31 separately. When volume of a low-voltage terminal of the refrigeration system needs to be increased, the low-voltage terminal volume valve 40 is opened, and a volume increase range is adjusted by a piston stroke of the low-voltage terminal volume adjuster 41. In the high-voltage terminal volume adjusting subsystem, a high-voltage terminal volume adjuster 42 is connected to a high-voltage terminal volume valve 43. The volume valve 43 is connected to the normal-temperature outlet valve 22-1 and the high-temperature outlet valve 23-1 separately. When volume of a high-voltage terminal of the refrigeration system needs to be increased, the high-voltage terminal volume valve 43 is opened, and a volume increase range is adjusted by a piston stroke of the high-voltage terminal volume adjuster 42. Liquid storage volume of the refrigeration system is adjusted by the condensing coils, and opening and closing of the large condensing coil inlet valve 25-1, the large condensing coil outlet valve 25-2, the small condensing coil inlet valve 26-1 and the small condensing coil outlet valve 26-2 realize three liquid storage volume combinations, that is, volume of the single large condensing coil 27, volume of the single small condensing coil 28 and the volumes of the large condensing coil 27 and the small condensing coil 28. The large condensing coil 27 and the small condensing coil 28 are arranged in a condensing chamber 20, the condensing chamber 20 is provided with a condensing chamber heater 58, and the condensing chamber heater 58 adjusts temperature of the condensing chamber 20. When the temperature of the condensing chamber 20 is higher than refrigerant condensing temperature, refrigerants in the large condensing coil 27 and the small condensing coil 28 are vaporized, and the condensing coils adjust gas-liquid states of the refrigerants inside.

The test refrigeration system of the present example realizes automatic control of the filling amount of the test medium in pipelines by means of adjustment of the liquid adding subsystem and the discharging subsystem. In the liquid adding subsystem, one end of the exhaust liquid adding valve 44 and one end of a suction liquid adding valve 39 are connected to the normal-temperature outlet valve 22-1 and the normal-temperature inlet valve 22-2 separately, the other end of the exhaust liquid adding valve 44 and the other end of the suction liquid adding valve 39 are connected to the liquid adding needle valve 45, and the liquid adding needle valve 45 is connected to the liquid adding hand valve 46. The liquid adding needle valve 45 may control flow of the test medium entering the pipelines, such that system pressure is prevented from fluctuating too sharply in a liquid adding process. In the exhaust subsystem, one end of an exhaust discharging valve 47 and one ends of a suction discharging valve 37 are connected to the normal-temperature outlet valve 22-1 and the normal-temperature inlet valve 22-2 separately, the other end of the exhaust discharging valve 47 and the other end of the suction discharging valve 37 are connected to a discharging needle valve 48, and the discharging needle valve 48 is then connected to a discharging hand valve 50. The discharging adding needle valve 48 may control flow of the test medium discharged from the pipelines, such that the system pressure is prevented from fluctuating too sharply in a discharging process.

The test refrigeration system in the present example also has the functions of evacuation and recovery, which are realized by the vacuumizing subsystem and the recovery subsystem separately. In the vacuumizing subsystem, one end of an evacuation valve 35 is connected to the normal-temperature inlet valve 22-2 and the high-temperature inlet valve 23-2 separately, the other end of the evacuation valve 35 is connected to a vacuum pump 36, and when the refrigeration system needs to be vacuumized, the evacuation valve 35 and the vacuum pump 36 are opened. In the recovery subsystem, one end of a recovery valve 56 is connected to the exhaust discharging valve 47 and the suction discharging valve 37, and the other end of the recovery valve 56 is connected to a recovery pump 55, and then connected to an oil separator 54, a recovery condenser 53, a recovery liquid storage tank 52 and a recovery hand valve 51 in turn. The recovery liquid storage tank 52 is connected to a recycling hand valve 49, and the recycling hand valve 49 is connected to the liquid adding hand valve 46, such that refrigerants recovered from the recovery liquid storage tank 52 may be recycled by the refrigeration system, and then a utilization rate of the refrigerants is improved.

Figure 4:
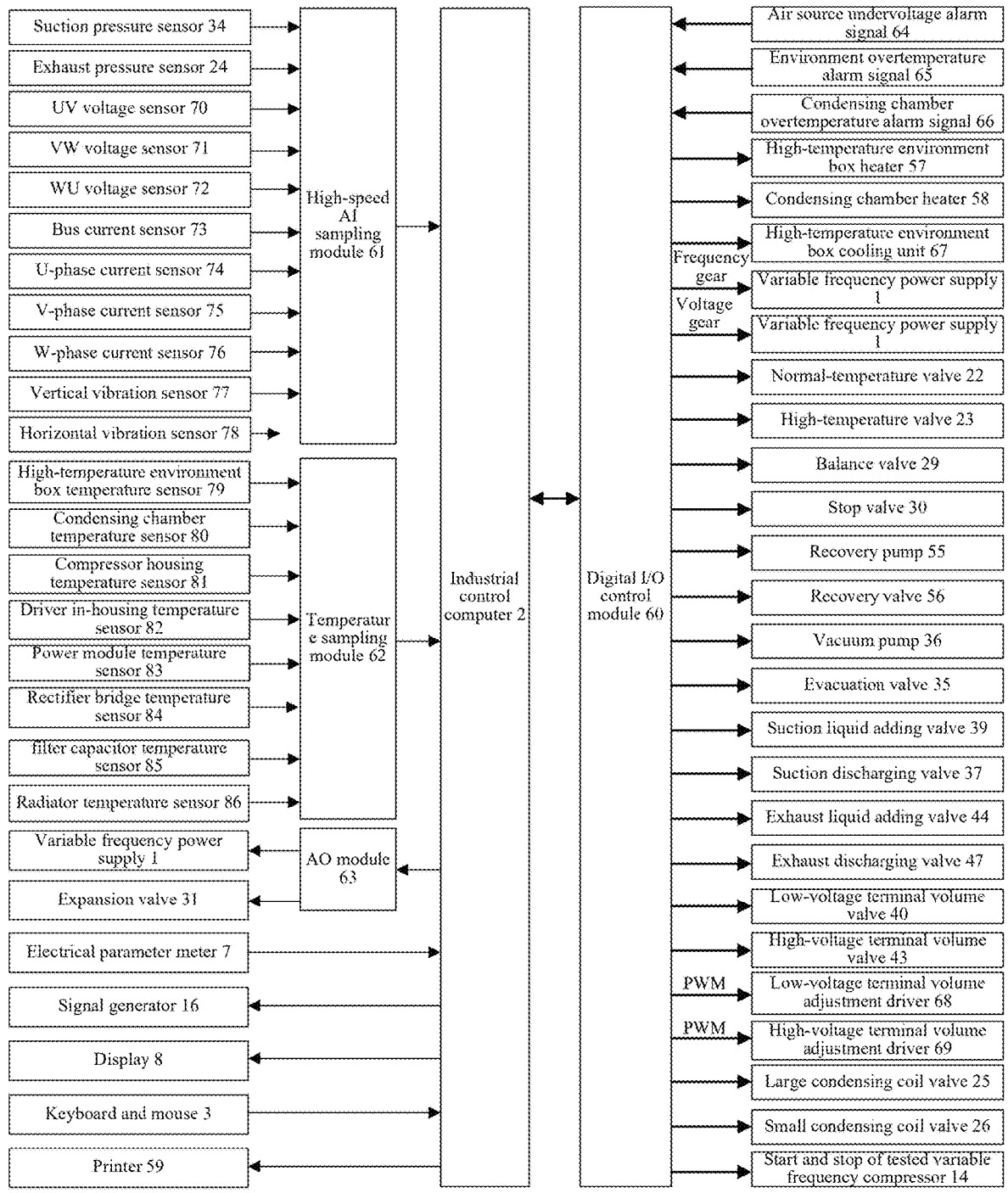
FIG. 4 is a diagram showing hardware architecture of a test control system of the device in the present disclosure.

A hardware architecture of the test control system of the device for testing starting characteristics of a refrigeration compressor with adjustable system volume in the present example is shown in FIG. 4, the test control system takes the industrial control computer 2 as a control core, which realizes system control, data acquisition and data processing of the whole testing device. The industrial control computer 2 uses a display 8, the keyboard and mouse 3 and a printer 59 as input and output apparatuses, such that man-machine conversation and report printing of the testing device are realized. The industrial control computer 2 realizes input and output control of digital quantity of the testing device by means of a digital I/O control module 60. Digital quantity input signals include an air source undervoltage alarm signal 64, an environment overtemperature alarm signal 65 and a condensing chamber overtemperature alarm signal 66. The output of the digital quantity includes the high-temperature environment box heater 57, the condensing chamber heater 58, a high-temperature environment box cooling unit 67, a frequency gear of a variable frequency power supply 1, a voltage gear of the variable frequency power supply 1, the normal-temperature valves 22, the high-temperature valves 23, the balance valve 29, the stop valve 30, the recovery pump 55, the recovery valve 56, the vacuum pump 36, the vacuum valve 35, the suction liquid adding valve 39, the suction discharging valve 37, the exhaust liquid adding valve 44, the exhaust discharging valve 47, the low-voltage terminal volume valve 40, the high-voltage terminal volume valve 43, a low-voltage terminal volume adjustment driver 68, a high-voltage terminal volume adjustment driver 69, the large condensing coil valves 25, the small condensing coil valves 26 and the tested variable frequency compressor 14 (the output of the digital quantity is opening and closing of 0/1 or gear high and low signal). The industrial control computer 2 realizes data collection of main starting characteristic parameters of the tested variable frequency compressor by means of a high-speed AI sampling module 61, including sensor data of a suction pressure sensor 34, an exhaust pressure sensor 24, a UV voltage sensor 70, a VW voltage sensor 71, a WU voltage sensor 72, a bus current sensor 73, a U-phase current sensor 74, a V-phase current sensor 75, a W-phase current sensor 76, a vertical vibration acceleration sensor 77 and a horizontal vibration acceleration sensor 78. The industrial control computer 2 collects temperature data of key parts of the tested variable frequency compressor 14 and the driver by means of a temperature sampling module 62, including sensor data of a high-temperature environment box temperature sensor 79, a condensing chamber temperature sensor 80, a compressor housing temperature sensor 81, a driver in-housing temperature sensor 82, a power module temperature sensor 83, a rectifier bridge temperature sensor 84, a filter capacitor temperature sensor 85 and a radiator temperature sensor 86. The industrial control computer 2 realizes automatic adjustment of the expansion valve 31 and voltage of the variable frequency power supply 1 of the refrigeration system by means of an AO output module 63. The industrial control computer 2 realizes collection of input voltage, current, power, frequency and other electrical parameters of the variable frequency compressor 14 and the variable frequency driver by means of the electrical parameter meter 7. The industrial control computer 2 realizes automatic adjustment of rotation speed of the tested variable frequency compressor 14 by means of the signal generator 16.

In the low-voltage terminal and the high-voltage terminal volume adjustment of the test refrigeration system in the present example, the low-voltage terminal volume adjustment driver 68 and the high-voltage terminal volume adjustment driver 69 receive PWM pulse signals with a certain duty ratio generated by the digital I/O control module 60, and rotation angles of stepping electric motors of the low-voltage terminal volume adjuster 41 and the high-voltage terminal volume adjuster 42 are controlled, such that piston positions of the low-voltage terminal volume adjuster 41 and the high-voltage terminal volume adjuster 42 are adjusted, and the low-voltage terminal and the high-voltage terminal system volume adjustment is realized.

Figure 5:
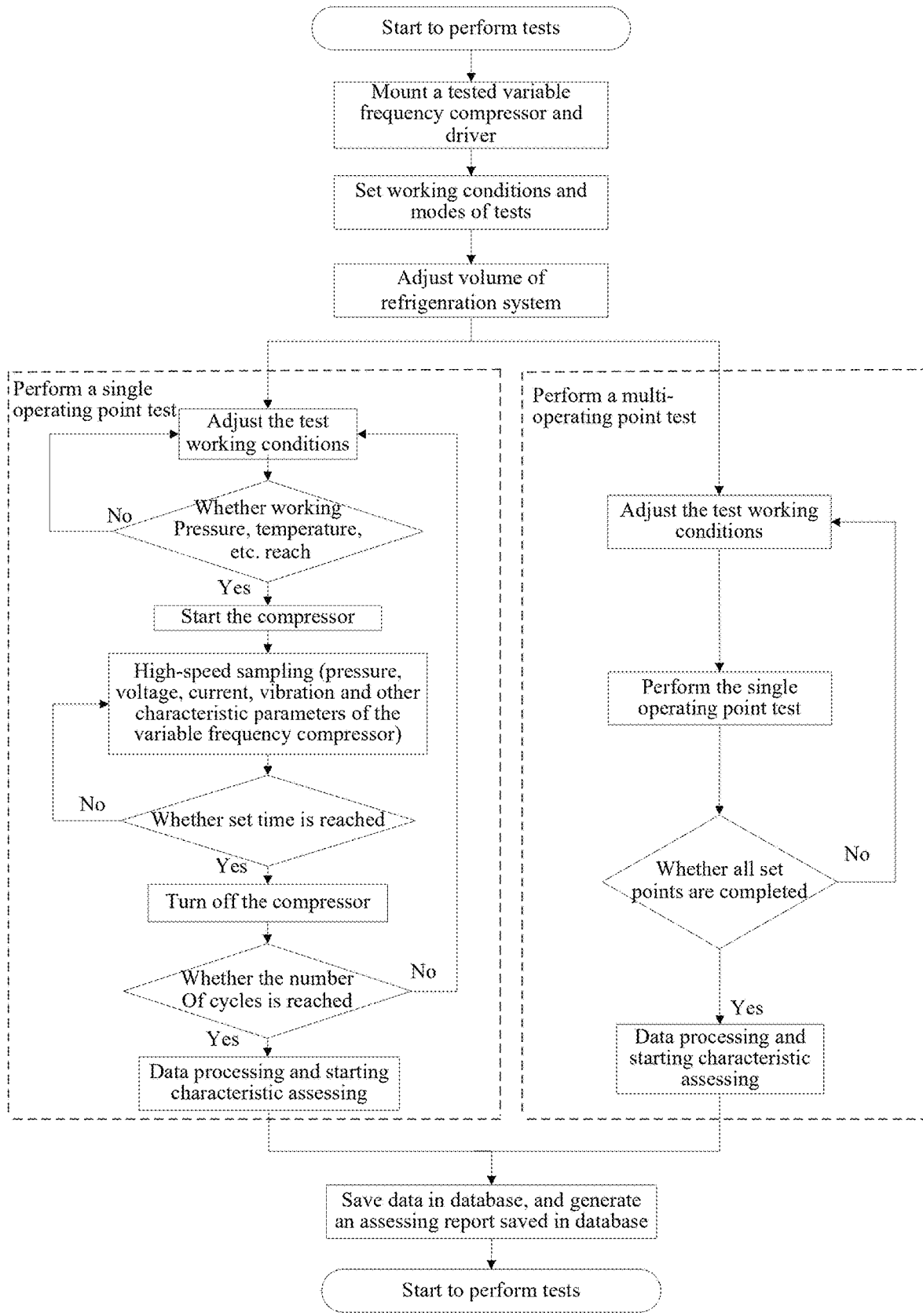
FIG. 5 is a flowchart of an testing method in the present disclosure.

An testing flow of an testing method for the device for testing starting characteristics of a refrigeration compressor with adjustable system volume is shown in FIG. 5, and specifically includes:

step 1: the tested variable frequency compressor and the tested variable frequency driver are mounted: the tested samples in the present example are a fully enclosed reciprocating variable frequency refrigeration compressor and a variable frequency driver thereof, and test environment temperature is normal temperature. The tested variable frequency compressor 14 and the driver are placed in the normal-temperature environment box 13, and then the exhaust interface and the suction interface of the tested variable frequency compressor 14 are connected to the normal-temperature outlet valve 22-1 and the normal-temperature inlet valve 22-2.

Step 2, test parameters and test modes are set: before testing starting characteristics, test working conditions are set, and working condition parameters include exhaust pressure, suction pressure, environment temperature, working voltage, rotation speed frequency and the number of cycles. In the present example, in the working condition parameters, the exhaust pressure is 0.36 MPa, the suction pressure is 0.36 MPa, the working voltage is 220 V, the rotation speed frequency is 120 Hz, and the set cycle test is 20 times. In the present example, the test mode is selected as a single operating point test, and a starting characteristic test is performed on the tested variable frequency compressor and the driver under the set working condition parameters.

Step 3: volume of the refrigeration system is adjusted: in the present example, the high-voltage terminal volume valve 43 is opened, and an internal piston is controlled to a set position by the stepping electric motor of the high-voltage terminal volume adjuster 42, so as to realize the high-voltage terminal volume adjustment of the refrigeration system. The low-voltage terminal volume valve 40 is closed to realize the low-voltage terminal volume adjustment of the refrigeration system. Further, the large condensing coil inlet valve 25-1 and the large condensing coil outlet valve 25-2 are closed, and the small condensing coil inlet valve 26-1 and the small condensing coil outlet valve 26-2 are opened, such that the liquid storage volume adjustment of the refrigeration system is realized. Finally, the volume adjustment of starting characteristics of the compressor of the refrigeration system of testing device is completed.

Step 4, system test working conditions are adjusted: suction and exhaust pressure working conditions of the testing device for the starting characteristics of the variable frequency compressor are controlled by means of opening and closing of the exhaust liquid adding valve 44, the suction liquid adding valve 39, the exhaust discharging valve 47 and the suction discharging valve 37. The test environment temperature is normal temperature, and the environment temperature does not need to be controlled. The working voltage working condition is controlled by the AO output module 63 to control the variable frequency power supply 1. The rotation speed frequency working condition is controlled by the signal generator 16.

Step 5: the starting characteristic parameters are collected: in the present example, a collection rate of the high-speed AI sampling module of the test control system is set to 10 KS/s, and after the tested variable frequency compressor 14 and the driver are started, the high-speed AI sampling module 61 of the test control system starts to synchronously collect various characteristic parameters, including suction and exhaust pressure, interphase voltage, phase line current, vibration acceleration, etc. Further, the temperature sampling module 62 collects other data, including the housing temperature of the variable frequency compressor, the in-housing temperature of the driver, the power module temperature, etc. The electrical parameter meter 7 collects various electrical parameters input by the variable frequency driver. After the tested variable frequency compressor 14 operates for a certain time, the test control system turns off the variable frequency compressor 14, and then determines whether the number of cycles satisfy the set requirements, and starting characteristic testing is entered after the test times reach.

Step 6, assessing the starting characteristics: processing obtained test data, assessing the starting characteristics of the tested variable frequency compressor 14 and the tested variable frequency driver, generating a starting characteristic assessing report, and finally saving the test data and the report in a database.

Figure 6:
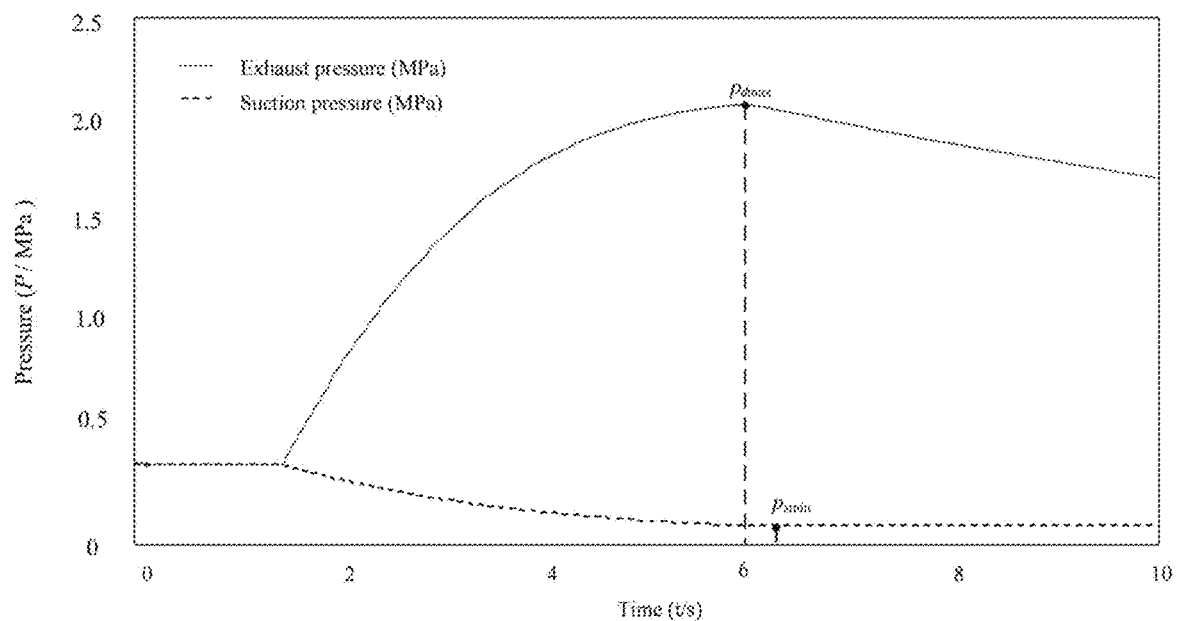
FIG. 6 is a diagram showing suction and exhaust pressure in the starting stage of the testing method in the present disclosure.
Figure 7:
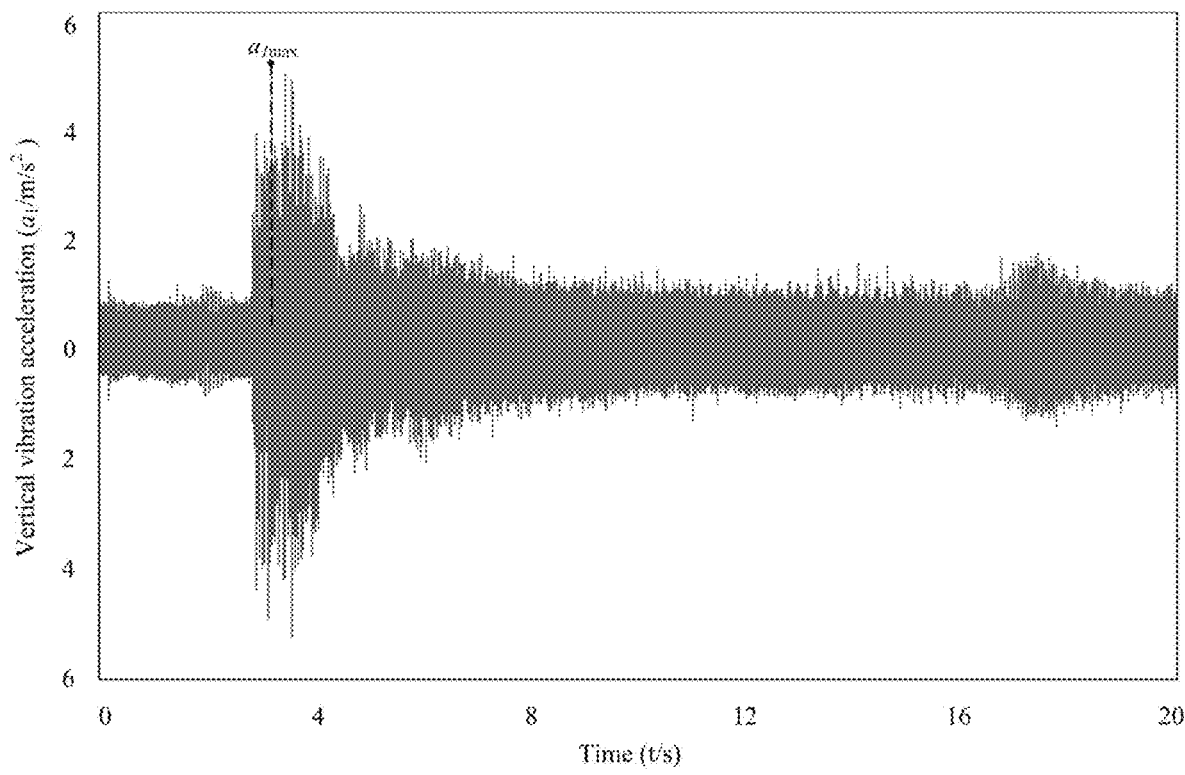
FIG. 7 is a diagram showing vibration acceleration in the starting stage of the testing method in the present disclosure.
Figure 8:
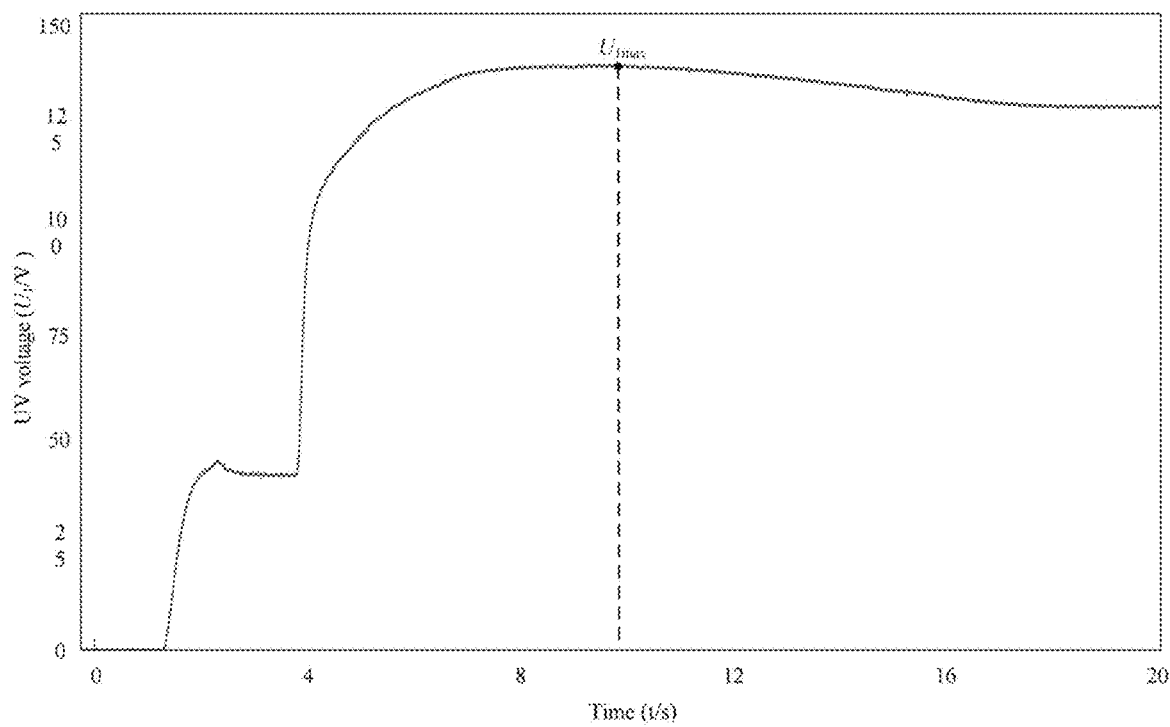
FIG. 8 is a diagram showing UV voltage in the starting stage of the testing method in the present disclosure.
Figure 9:
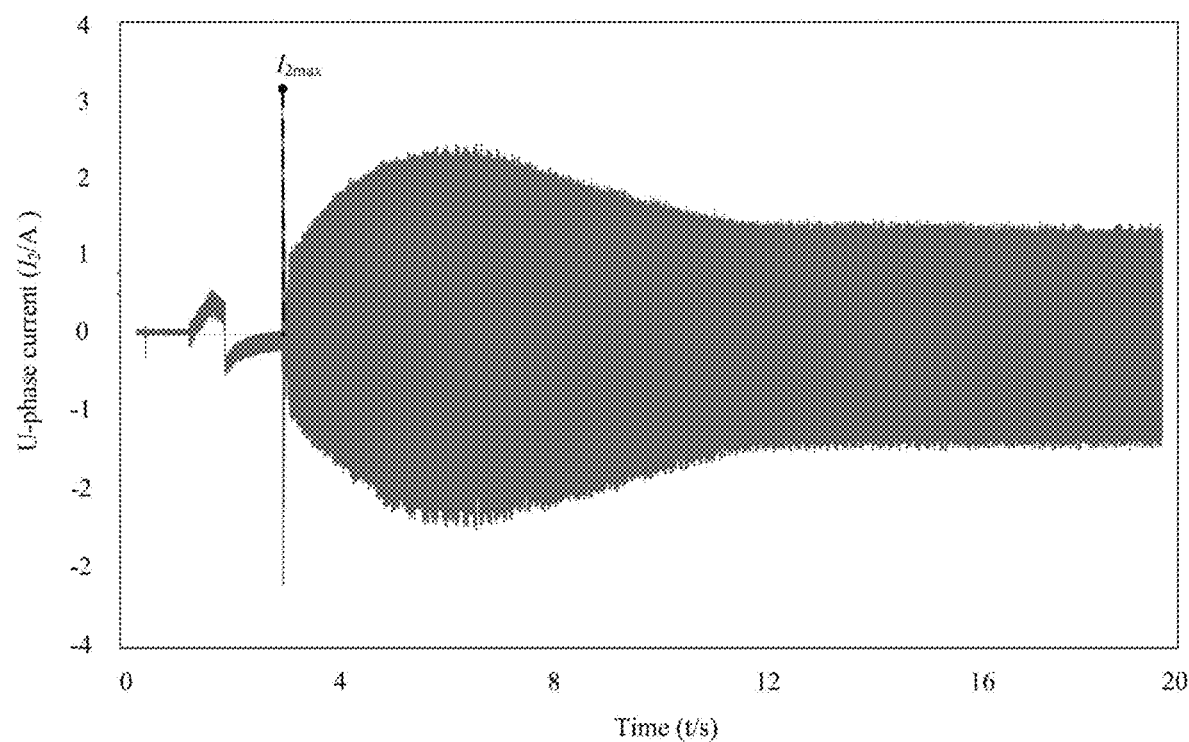
FIG. 9 is a diagram showing U-phase current in the starting stage of the testing method in the present disclosure.

According to the testing method for the device for testing starting characteristics of a refrigeration compressor with adjustable system volume in the present example, assessing of the starting transient characteristic parameters thereof is to determine the parameters such as the suction and exhaust pressure, the vibration acceleration, the interphase voltage and the phase line current. The suction and exhaust pressure in the starting process is shown in FIG. 6. In the present example, the minimum value of the suction pressure of the tested variable frequency compressor $p_{smin}$ is 0.07 MPa, and a designed suction pressure threshold $p'_s$ should be 0.11 MPa, such that the suction pressure in the starting process of the tested variable frequency compressor satisfies the design requirements. In the present example, the maximum value of the exhaust pressure of the tested variable frequency compressor $p_{dmax}$ is 2.12 MPa, and a designed exhaust pressure threshold $p'_d$ is 0.97 MPa, such that the exhaust pressure of the tested variable frequency compressor satisfies design requirements. The vibration acceleration in the starting process is shown in FIG. 7. In the present example, the maximum value $a_{1max}$ of the vertical vibration acceleration of the tested variable frequency compressor is 5.09 m/s$^2$, and a designed vertical vibration acceleration threshold $a'_1$ should be less than 1.0 g (9.8 m/s$^2$), such that the vertical vibration acceleration in the starting process of the tested variable frequency compressor satisfies design requirements. The UV voltage in the starting process is shown in FIG. 8. In the present example, a maximum value $U_{1max}$ of the UV voltage of the tested inverter compressor is 136.82 V, and a designed UV voltage threshold $U'_1$ is 100-150 V, such that the UV voltage in the starting process of the tested inverter compressor satisfies design requirements. The U-phase current in the starting process is shown in FIG. 9. In the present example, the maximum value $I_{2max}$ of the U-phase current of the tested inverter compressor is 3.38 A, and a designed U-phase current threshold $I'_2$ should be less than 4 A, such that the U-phase current in the starting process of the tested inverter compressor satisfies design requirements.

According to the testing method for the device for testing starting characteristics of a refrigeration compressor with adjustable system volume in the present example, assessing of non-transient characteristic parameters thereof is to determine parameters such as the in-housing temperature, the in-housing temperature of the variable frequency driver, the power module temperature, the rectifier bridge temperature, the filter capacitor temperature and the radiator temperature. In the starting process of the tested variable frequency compressor, if the maximum value of all the temperature is less than or equal to a design threshold, the temperature is determined to be qualified, otherwise the temperature is determined to be unqualified.

Figure 10:
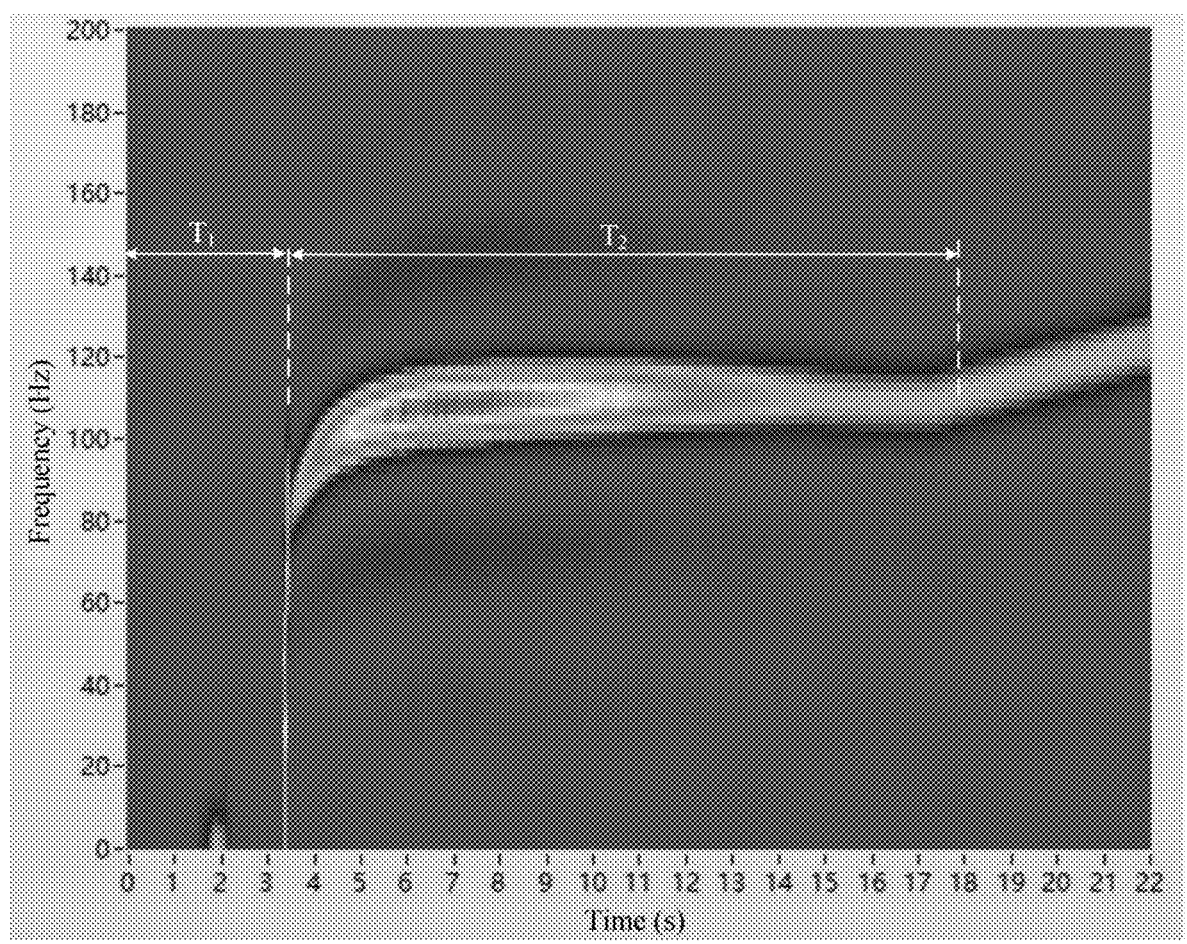
FIG. 10 is a time-frequency diagram of current in the starting stage of the testing method in the present disclosure.

According to the testing method for testing starting characteristics of a refrigeration compressor with adjustable system volume in the present example, the starting characteristics of the tested samples are assessed by the real-time rotation speed in the starting stage. Firstly, a phase current time sequence signal of the tested variable frequency compressor is subjected to time-frequency transformation to obtain a time-frequency diagram of the phase current in the staring stage, as shown in FIG. 10. An initial staring process of the present example may be divided into two stages, that is, a positioning staring stage and an oil feeding platform stage, design time of the positioning staring stage should be less than 5 s, design time of the oil feeding platform stage is generally 15-20 s, and design rotation speed is 2000-2500 rpm. In the present example, a rotor of the tested variable frequency compressor has 3 pole pairs, and the real-time rotation speed of the tested variable frequency compressor may be calculated by the above formula (3). In the present example, time $T_1$ of the positioning starting stage of the tested variable frequency compressor is 3.3 s, time $T_2$ of the oiling feeding platform stage is 15.2 s, and rotation speed of the oiling feeding platform stage is 2200 rpm, such that the starting rotation speed control of the tested variable frequency compressor satisfies design requirements.

What are described above are merely preferred examples of the present disclosure, but not intended to limit the present disclosure, and any modifications, equivalent replacements, improvements, etc. made within the spirit and principles of the disclosure should fall within the scope of protection of the present disclosure.

What is claimed is:

1. A device for testing starting characteristics of a refrigeration compressor with an adjustable system volume, comprising tested samples, a test refrigeration system and a test control system, wherein the testing device uses a dual-environment structure, in which two assembly stations are set for the tested samples, and are configured to provide different test temperature environments, that is, a first temperature test environment and a second temperature test environment, and the tested samples at the two assembly stations are subjected to a round-trip test at a first temperature and a second temperature; and test temperature of the first temperature test environment is temperature of the environment where the tested samples are located, and a test temperature range of the second temperature test environment is within environment temperature to 90° C.;

the tested samples comprise a tested variable frequency compressor and a tested variable frequency driver, the tested samples are put in a first temperature environment box of the testing device when a first temperature working condition test is performed on the tested variable frequency compressor and the tested variable frequency driver, and the tested samples are put in a second temperature environment box of the testing device when a second temperature working condition test is performed on the tested variable frequency compressor and the tested variable frequency driver;

the test refrigeration system adjusts volume to satisfy test requirements of the tested samples for different refrigeration system volumes, and the test refrigeration system comprises a main circulation subsystem, a first-voltage terminal volume adjusting subsystem, a second-voltage terminal volume adjusting subsystem, a liquid adding subsystem, an exhaust subsystem, a recovery subsystem and a vacuumizing subsystem;

the main circulation subsystem comprises a first temperature outlet valve, a first temperature inlet valve, a second temperature outlet valve, a second temperature inlet valve, an exhaust pressure sensor, a first condensing coil, a first condensing coil inlet valve, a first condensing coil outlet valve, a second condensing coil, a second condensing coil inlet valve, a second condensing coil outlet valve, a balance valve, a stop valve, an expansion valve, an evaporation coil, an evaporation fan and a suction pressure sensor; the first temperature outlet valve and the second temperature outlet valve are connected to the exhaust pressure sensor, the first condensing coil inlet valve and the second condensing coil inlet valve separately, the first condensing coil inlet valve is connected to an inlet of the first condensing coil, and an outlet of the first condensing coil is connected to the first condensing coil outlet valve; the second condensing coil inlet valve is connected to an inlet of the second condensing coil, and an outlet of the second condensing coil is connected to the second condensing coil outlet valve; and the first condensing coil outlet valve and the second condensing coil outlet valve are connected to the balance valve and the stop valve separately, the stop valve is connected to the expansion valve, and the balance valve and the expansion valve are connected to the evaporation coil; the evaporation fan is located in front of the evaporation coil, and the evaporation coil is connected to the suction pressure sensor, the first temperature inlet valve and the second temperature inlet valve separately;

the first-voltage terminal volume adjusting subsystem comprises a first-voltage terminal volume valve and a first-voltage terminal volume adjuster, the first-voltage terminal volume adjuster is connected to the first-voltage terminal volume valve, and the first-voltage terminal volume valve is connected to the evaporation coil, the balance valve and the expansion valve separately; and the second-voltage terminal volume adjusting subsystem comprises a second-voltage terminal volume valve and a second-voltage terminal volume adjuster, the second-voltage terminal volume adjuster is connected to the second-voltage terminal volume valve, and the second-voltage terminal volume valve is connected to the first temperature outlet valve and the second temperature outlet valve separately;

a volume of the test refrigeration system is adjusted by the first-voltage terminal volume adjusting subsystem, the second-voltage terminal volume adjusting subsystem and the condensing coils;

when a volume of a first voltage terminal of the test refrigeration system needs to be increased, the first-voltage terminal volume valve is opened, and a volume increase range is adjusted by a piston stroke of the first-voltage terminal volume adjuster;

when a volume of a second voltage terminal of the test refrigeration system needs to be increased, the second-voltage terminal volume valve is opened, and a volume increase range is adjusted by a piston stroke of the second-voltage terminal volume adjuster;

a liquid storage volume of the test refrigeration system is adjusted by the condensing coils, and opening and closing of the first condensing coil inlet valve, the first condensing coil outlet valve, the second condensing coil inlet valve and the second condensing coil outlet valve realizing three liquid storage volume combinations, that is, a volume of the single first condensing coil, a volume of the single second condensing coil and the volumes of the first condensing coil and the second condensing coil; and the test control system realizes system control, data acquisition and data processing of the testing device, comprising an industrial control computer, a digital I/O control module, an analog input sampling module, a temperature sampling module and an AO output module.

2. The device for testing starting characteristics of the refrigeration compressor with the adjustable system volume according to claim 1, wherein when a test is performed in a first temperature working condition, an exhaust interface and a suction interface of the tested variable frequency compressor are mounted on the first temperature outlet valve and the first temperature inlet valve separately; and when a test is performed in a second temperature working condition, the exhaust interface and the suction interface of the tested variable frequency compressor are mounted on the second temperature outlet valve and the second temperature inlet valve separately; and the first condensing coil and the second condensing coil are arranged in a condensing chamber separately, the condensing chamber is provided with a condensing chamber heater, and the condensing chamber heater adjusts a temperature of the condensing chamber; and when the temperature of the condensing chamber is higher than a refrigerant condensing temperature, refrigerants in the first condensing coil and the second condensing coil are vaporized, which has a adjust effect on gas-liquid states of the refrigerants inside.

3. The device for testing starting characteristics of the refrigeration compressor with the adjustable system volume according to claim 2, wherein the liquid adding subsystem comprises a one-way valve, a suction liquid adding valve, an exhaust liquid adding valve, a liquid adding needle valve and a liquid adding hand valve; and one end of the exhaust liquid adding valve and one end of the suction liquid adding valve are connected to the first temperature outlet valve and the first temperature inlet valve separately, other end of the exhaust liquid adding valve and other end of the suction liquid adding valve are connected to the liquid adding needle valve, and the liquid adding needle valve is then connected to the liquid adding hand valve;

the exhaust subsystem comprises a one-way valve, a suction discharging valve, an exhaust discharging valve, a discharging needle valve and a discharging hand valve; one end of the exhaust discharging valve and one end of the suction discharging valve are connected to the first temperature outlet valve and the first temperature inlet valve separately, other end of the exhaust discharging valve and other end of the suction discharging valve are connected to the discharging needle valve, and the discharging needle valve is then connected to the discharging hand valve;

the recovery subsystem comprises a recycling hand valve, a recovery hand valve, a recovery liquid storage tank, a recovery condenser, an oil separator, a recovery pump and a recovery valve; one end of the recovery valve is connected to the exhaust discharging valve and the suction discharging valve separately, other end of the recovery valve is connected to the recovery pump, and then connected to the oil separator, the recovery condenser, the recovery liquid storage tank and the recovery hand valve in turn; and the recovery liquid storage tank is connected to the recycling hand valve, the recycling hand valve is connected to the liquid adding hand valve, refrigerants recovered to the recovery liquid storage tank are recycled by the test refrigeration system, and then a utilization rate of the refrigerants is improved; and the vacuumizing subsystem comprises an evacuation valve and a vacuum pump, one end of the evacuation valve is connected to the first temperature inlet valve and the second temperature inlet valve separately, other end of the evacuation valve is connected to the vacuum pump, and when the test refrigeration system needs to be vacuumized, the evacuation valve and the vacuum pump are opened.

4. The device for testing starting characteristics of the refrigeration compressor with the adjustable system volume according to claim 1, wherein the industrial control computer realizes input and output control of digital quantity of the testing device by means of the digital I/O control module; synchronous collection of transient characteristic parameters of the tested variable frequency compressor is realized by the analog input sampling module; collection of non-transient characteristic parameters of the tested variable frequency compressor and the tested variable frequency driver and temperature data of corresponding parts of the testing device are realized by means of the temperature sampling module; and the industrial control computer realizes automatic adjustment of the expansion valve and voltage of a variable frequency power supply of the test refrigeration system by means of the AO output module.

5. The device for testing starting characteristics of the refrigeration compressor with the adjustable system volume according to claim 4, wherein the transient characteristic parameters comprise an exhaust pressure, a suction pressure, a vertical vibration acceleration and a horizontal vibration acceleration of the tested variable frequency compressor, and a UV voltage, VW voltage, a WU voltage, bus current, a U-phase current, a V-phase current and a W-phase current input by the variable frequency compressor; and the non-transient characteristic parameters comprise a housing temperature of the tested variable frequency compressor, an in-housing temperature of the driver, a power module temperature, a rectifier bridge temperature, a filter capacitor temperature and a radiator temperature.

6. A testing method for the device for testing starting characteristics of the refrigeration compressor with the adjustable system volume according to claim 1, comprising:

step 1, mounting a tested variable frequency compressor and a tested variable frequency driver: determining test environment temperature requirements of tested samples; when a test is performed in a first temperature environment, putting the tested variable frequency compressor and the tested variable frequency driver in the first temperature environment box; and when a test is performed in a second temperature environment, putting the tested variable frequency compressor and the tested variable frequency driver in the second temperature environment box, and then completing connection between suction and exhaust pipelines and an electrical circuit of the tested variable frequency compressor;

step 2, setting test parameters and test modes: before testing starting characteristics, setting test working conditions, wherein the test working condition parameters comprise an exhaust pressure, a suction pressure, an environment temperature, a working voltage, a rotation speed frequency and a number of cycles; and the test modes are divided into two test modes, one is single working condition point test, another is multi-working condition point test;

step 3, adjusting a volume of the refrigeration system: determining a system volume for testing the starting characteristics of the tested variable frequency compressor according to a matching situation of the tested samples and the test refrigeration system, and then completing a volume adjustment of the test refrigeration system of the testing device for the starting characteristics of the refrigeration compressor by means of piston positions of the second-voltage terminal volume adjuster and the first-voltage terminal volume adjuster, and opening and closing of the first condensing coil inlet valve, the first condensing coil outlet valve, the second condensing coil inlet valve and the second condensing coil outlet valve;

step 4, adjusting system test working conditions: automatically adjusting working conditions for testing starting characteristic of the tested samples, and starting the tested variable frequency compressor by the driver when working condition parameters satisfy set requirements;

step 5, starting collection of characteristic parameters: after the tested variable frequency compressor is started, realizing synchronous collection of transient characteristic parameters of the tested variable frequency compressor by the test control system by means of an analog input sampling module; realizing collection of non-transient characteristic parameters of the tested variable frequency compressor and the tested variable frequency driver and temperature data of corresponding parts of the testing device by means of the temperature sampling module; and after the tested variable frequency compressor runs for a specified time, turning off the tested variable frequency compressor by the test control system, and then determining whether the number of cycles satisfy set requirements;

step 6, assessing the starting characteristics: processing obtained test data, assessing the starting characteristics of the tested variable frequency compressor and the tested variable frequency driver, generating a starting characteristic assessing report, and saving the test data and the report in a database; wherein in the step 6, the starting characteristics of the tested variable frequency compressor and the tested variable frequency driver are assessed by starting the transient characteristic parameters, that is, determination of parameters of the suction and exhaust pressure, the vibration acceleration, an interphase voltage and a phase line current; or in the step 6, the starting characteristics of the tested variable frequency compressor and the tested variable frequency driver are assessed by starting the non-transient characteristic parameters, that is, determination of parameters of a housing temperature, an in-housing temperature of the driver, a power module temperature, a rectifier bridge temperature, a filter capacitor temperature and a radiator temperature; or in the step 6, the starting characteristics of the tested variable frequency compressor and the tested variable frequency driver are assessed by means of a real-time rotation speed in a starting stage.

7. The testing method for the device for testing starting characteristics of the refrigeration compressor with the adjustable system volume according to claim 6, wherein in the step 6, the starting characteristics of the tested variable frequency compressor and the tested variable frequency driver are assessed by starting the transient characteristic parameters, that is, determination of the parameters of the suction and exhaust pressure, the vibration acceleration, the interphase voltage and the phase line current;

in a starting process of the tested variable frequency compressor, if the minimum value $p_{smin}$ of the suction pressure $p_s$ is less than or equal to a design threshold $p'_s$, the suction pressure is determined to be qualified, otherwise the suction pressure is determined to be unqualified; if the maximum value $p_{dmax}$ of the exhaust pressure pa is greater than or equal to a design threshold $p'_d$, the exhaust pressure is determined to be qualified, otherwise the exhaust pressure is determined to be unqualified; if the maximum value $a_{imax}$ of the vibration acceleration $a_i$ is less than or equal to a design threshold $a'_i$, the vibration acceleration is determined to be qualified, otherwise the vibration acceleration is determined to be unqualified; if the maximum value $U_{jmax}$ of the interphase voltage $U_j$ is less than or equal to a design threshold $U'_j$, the interphase voltage is determined to be qualified, otherwise the interphase voltage is determined to be unqualified; if the maximum value $I_{kmax}$ of the phase line current $I_k$ is less than or equal to the design threshold $I'_k$, the phase line current is determined to be qualified, otherwise the phase line current is determined to be unqualified; and specific determination conditions are shown in Formula (1):

$$\begin{cases} p_{s\ min} \leq p'_s \\ p_{d\ max} \geq p'_d \\ a_{imax} \leq a'_i & i=1,2 \\ U_{jmax} \leq U'_j & j=1,2,3 \\ I_{kmax} \leq I'_k & k=1,2,3,4 \end{cases} \quad (1)$$

in the formula, $a_1$ is the vertical vibration acceleration, and $a'_1$ is a design threshold of the vertical vibration acceleration; $a_2$ is the horizontal vibration acceleration, and $a'_2$ is a design threshold of the horizontal vibration acceleration; $U_1$ is the UV voltage, and $U'_1$ is a design threshold of the UV voltage; $U_2$ is the VW voltage, and $U'_2$ is a design threshold of the VW voltage; $U_3$ is the WU voltage, and $U'_3$ is a design threshold of the WU voltage; $I'_3$ is the bus current, and $I'_2$, is a design threshold of the bus current; $I_2$ is the U-phase current, and $I'_2$ is a design threshold of the U-phase current; $I_3$ is the V-phase current, and $I'_3$ is a design threshold of the V-phase current; and $I_4$ is the W-phase current, and $I'_4$ is a design threshold of the W-phase current.

8. The testing method for the device for testing starting characteristics of the refrigeration compressor with the adjustable system volume according to claim 6, wherein in the step 6, the starting characteristics of the tested variable frequency compressor and the tested variable frequency driver are assessed by starting the non-transient characteristic parameters, that is, determination of the parameters of the housing temperature, the in-housing temperature of the driver, the power module temperature, the rectifier bridge temperature, the filter capacitor temperature and the radiator temperature;

in the starting process of the tested variable frequency compressor, if the maximum value $T_{imax}$ of each temperature is less than or equal to a design threshold $T'_i$, the temperature is determined to be qualified, otherwise the temperature is determined to be unqualified; and specific judgment conditions are shown in Formula (2):

$$T_{imax} \leq T'_i \quad i=1,2,3,4,5,6 \quad (2);$$

in the formula, $T_1$ is the housing temperature, and $T'_1$ is a design threshold of the housing temperature; $T_2$ is the in-housing temperature of the variable frequency driver, and $T'_2$ is a design threshold of the in-housing temperature of the variable frequency driver; $T_3$ is the power module temperature, and $T'_3$ is a design threshold of the power module temperature; $T_4$ is the rectifier bridge temperature, and $T'_4$ is a design threshold of the rectifier bridge temperature; $T_5$ is the filter capacitor temperature, and $T'_5$ is a design threshold of the filter capacitor temperature; and $T_6$ is the radiator temperature, and $T'_6$ is a design threshold of the radiator temperature.

9. The testing method for the device for testing starting characteristics of the refrigeration compressor with the adjustable system volume according to claim 6, wherein in the step 6, the starting characteristics of the tested variable frequency compressor and the tested variable frequency driver are assessed by means of the real-time rotation speed in the starting stage: firstly, the phase currents of the tested variable frequency compressor are subjected to time-frequency transformation, a time-frequency diagram of the currents in the starting stage is obtained, then the real-time rotation speed of the tested variable-frequency compressor is obtained, and whether the starting characteristics thereof satisfy the design requirements is determined by a real-time rotation speed curve in the starting stage; and calculation of the real-time rotation speed of the tested variable frequency compressor is shown in Formula (3):

$$n = \begin{cases} 30f & \text{(Rotor having 2 pole pairs)} \\ 20f & \text{(Rotor having 3 pole pairs)} \end{cases}; \qquad (3)$$

in the formula, n is a rotation speed of the tested variable frequency compressor, and f is a current frequency of the tested variable frequency compressor.

\* \* \* \* \*